United States Patent [19]

Wiseman

[11] Patent Number: 4,929,133

[45] Date of Patent: May 29, 1990

[54] LOADING PALLET FOR AIRCRAFT CARGO CONTAINERS

[75] Inventor: Albert D. Wiseman, Wilmington, Ohio

[73] Assignee: Airborne Express, Inc., Wilmington, Ohio

[21] Appl. No.: 338,039

[22] Filed: Apr. 14, 1989

[51] Int. Cl.⁵ .............................. B64C 1/20; B60P 3/06
[52] U.S. Cl. ........................................ 410/52; 410/67; 244/118.2
[58] Field of Search ........................ 410/52, 66, 67, 77, 410/78, 94, 95, 80, 84, 156; 244/118.1, 118.2; 238/10 R, 12

[56] References Cited

U.S. PATENT DOCUMENTS 2,543,460  2/1951  Larrabee ............................ 238/12
4,388,030  6/1983  Skaale .............................. 244/118.1
4,747,504  5/1988  Wiseman et al. ..................... 220/1.5

*Primary Examiner*—Andres Kashnikow
*Assistant Examiner*—Mark T. Le

*Attorney, Agent, or Firm*—Vorys, Sater, Seymour and Pease

[57] ABSTRACT

A cargo pallet for use in loading and stowing relatively small wheeled cargo containers within the cargo bay of a cargo aircraft which is dimensioned to fit within the aircraft fuselage adjacent to the main cargo door and is provided with guide rails adjacent to its lateral edges, wherein at least one of the guide rails does not extend entirely along the edge, but has a gap to permit the wheeled containers to be rolled into the aircraft. The cargo pallet also has a removable center rail which is removed during loading and reinstalled to secure the final containers. Retractable side locks, located in the gap in the rail adjacent the main cargo door, are retracted during the loading operation to permit the containers to be loaded into the aircraft and extended to restrain the last loaded container, which is located adjacent to the main cargo door. The pallet is also provided with removable cargo stops to restrain the cargo containers in a fore-and-aft direction.

21 Claims, 9 Drawing Sheets

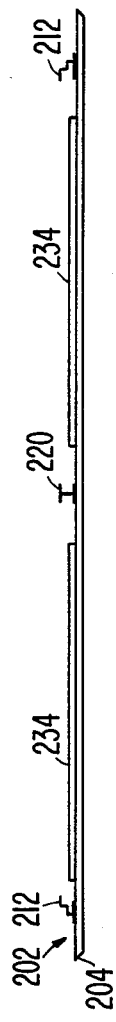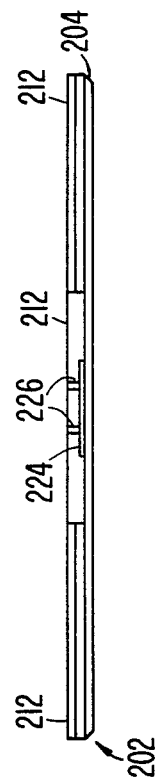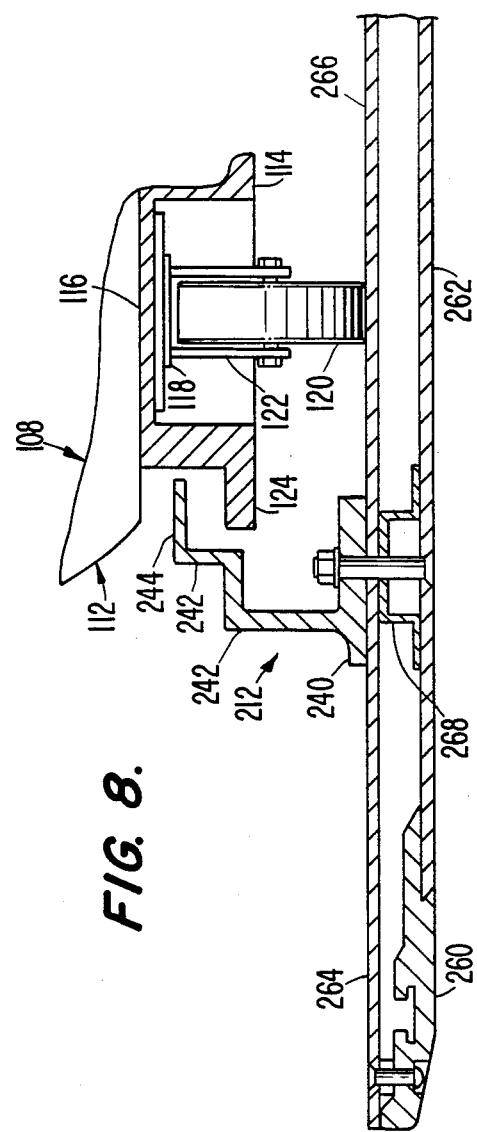

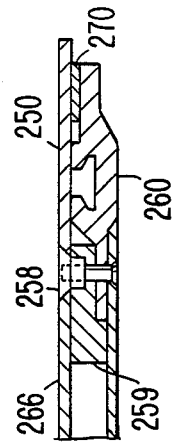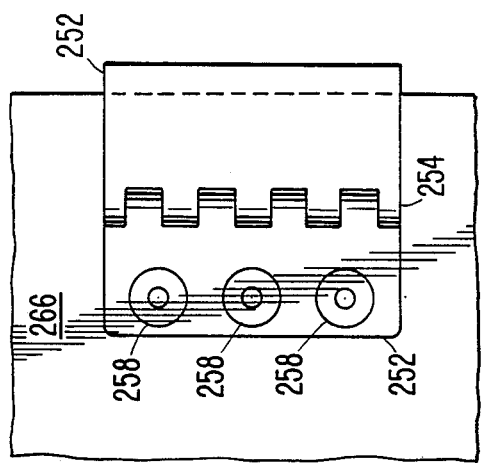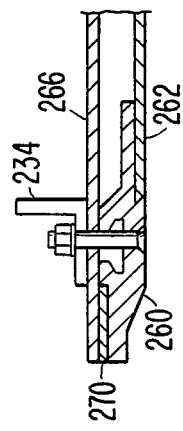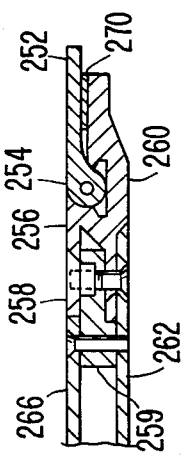

LOADING PALLET FOR AIRCRAFT CARGO CONTAINERS

BACKGROUND OF THE INVENTION

1. Field of the Invention:

This invention relates to equipment for handling aircraft cargo containers and more particularly to cargo pallets for use in loading wheeled cargo containers.

2. Brief Description of the Prior Art:

Many models of large commercial aircraft are produced in both passenger-carrying and cargo-carrying versions, which have essentially the same airframe but different interior fixtures and doors. The cargo-carrying versions have no seats but are equipped instead with cargo-handling fixtures and large doors to accept the large containers in which air freight is generally transported. Cargo aircraft are also usually equipped with cargo-handling devices such as passive and power-driven rollers in the floor and fixed and retractable stops to retain the cargo containers in place, as well as a restraining net between the cargo compartment and the flight deck. The conventional aircraft cargo containers are constructed to fit within the fuselage of each particular model of cargo-carrying aircraft and are designed to fill substantially the cross section of the cargo bay of the aircraft in order to accommodate as much cargo as possible. Because of the size and weight of the filled containers they are typically handled with large powered equipment. They are loaded through the doors of the aircraft with suitable lifting equipment and are moved into position within the aircraft by the use of the powered or passive rollers installed in the floor of the cargo bay.

Passenger-carrying models of aircraft are easily converted to cargo service by removing the seats. However, passenger aircraft have small doors, and, accordingly, the cargo must be handled in small containers. Recently, a relatively small cargo container has been designed which is adapted to fit through the small doors of passenger aircraft and to be stowed within the fuselage. Such a container is disclosed in U.S. Pat. No. 4,747,504, the entire specification of which is incorporated herein by reference. The containers disclosed in U.S. Pat. No. 4,747,504 are of such dimensions that they can fit through the doors of passenger aircraft and that each container fills only about half of the cross section of the cargo bay. The containers are provided with a bottom frame on which are mounted caster wheels and alignment flanges which engage guide rails fixed to the floor of the aircraft to keep the containers from moving laterally. In use the containers are rolled through the door, aligned with the guide rails fixed to the aircraft, and pushed into place in the cargo bay. The containers are then held in place and prevented from moving longitudinally by cargo stops fixed to the floor of the aircraft.

In addition to their use in passenger-type aircraft, the containers of U.S. Pat. No. 4,747,504 may be used in conventional cargo aircraft, when it is convenient to do so. In such aircraft, the rails for guiding and restraining the containers may be mounted on pallets fixed to the floor of the aircraft by the conventional pallet-restraining clamps attached to the aircraft structure. However, a pallet with guide rails cannot be placed adjacent the main cargo door, because the side rail would block wheeled containers from being rolled through the door, and the center rail would interfere with the movement needed to align the containers with the guide rails in the cargo bay. Consequently, either the area near the cargo door of such an aircraft has to be left empty of cargo, or the containers stowed there have to be secured by other means. The same problem is encountered in those aircraft which are designed for rapid interconversion between passenger-carrying and cargo-carrying service. Such aircraft may have both a passenger door, located at one end of the cabin, and a cargo door, located partway down the side of the aircraft. When the containers of U.S. Pat. No. 4,747,504 are used in such an aircraft, they may be loaded through either the passenger door or the main cargo door. However, when the main cargo door is used, a conventional pallet with guide rails cannot be used adjacent to the main cargo door, for the same reasons as described above.

Accordingly, a need has continued to exist for apparatus which can be located within the fuselage of a cargo-carrying aircraft adjacent to the door and which permits the wheeled containers to be moved laterally to be aligned with the retaining rails running lengthwise throughout the rest of the fuselage while still providing means for securely anchoring containers within the cargo bay near the door.

SUMMARY OF THE INVENTION

This problem has now been solved by the cargo pallet of this invention which is dimensioned to fit within the aircraft fuselage adjacent to the main cargo door and is provided with guide rails adjacent to its lateral edges, wherein at least one of the guide rails does not extend entirely along the edge, but is absent at the position of the aircraft door to permit the wheeled containers to be rolled into the aircraft. The cargo pallet also has a removable center rail which is removed while all but the last few containers are loaded, then installed on the pallet to help restrain the last few containers, which are located near the door. Retractable side latch means, located in the gap in the rail adjacent the door, are retracted during the loading operation to permit the containers to be loaded into the aircraft and extended to restrain the last loaded container, which is located adjacent to the door.

Accordingly, it is an object of this invention to provide an apparatus for facilitating loading of wheeled cargo containers into a cargo aircraft.

A further object is to provide an apparatus for facilitating loading of wheeled cargo containers through the loading door of a passenger aircraft which has been converted for carrying cargo.

A further object is to provide an apparatus which can facilitate loading of wheeled containers into a cargo-carrying aircraft and also secure the last-loaded containers.

A further object is to provide apparatus which facilitates container compatibility between passenger-type aircraft that have been converted for cargo-carrying and standard cargo-carrying aircraft.

Further objects of the invention will become apparent from the description of the invention which follows.

BRIEF DESCRIPTION OF THE DRAWINGS

FIG. 3 shows a front elevation of the pallet of the invention.

FIG. 4 shows a side elevation of the pallet of the invention.

FIG. 8 is a portion of the cross section of FIG. 8 showing the cooperation of the lateral guide rail with a flange on the container to provide lateral and vertical restraint.

FIG. 9 shows a cross section of a portion of the pallet at B—B in FIG. 2, showing the wheel stops.

FIG. 10 is a cross section of a portion of the pallet at C—C in FIG. 2, showing a fixed cover plate.

FIG. 11 is an alternate cross section at C—C in FIG. 2 showing a hinged cover plate.

FIG. 12 is a plan view of the hinged cover plate of FIG. 11.

DETAILED DESCRIPTION OF THE INVENTION AND PREFERRED EMBODIMENTS

Figure 1:
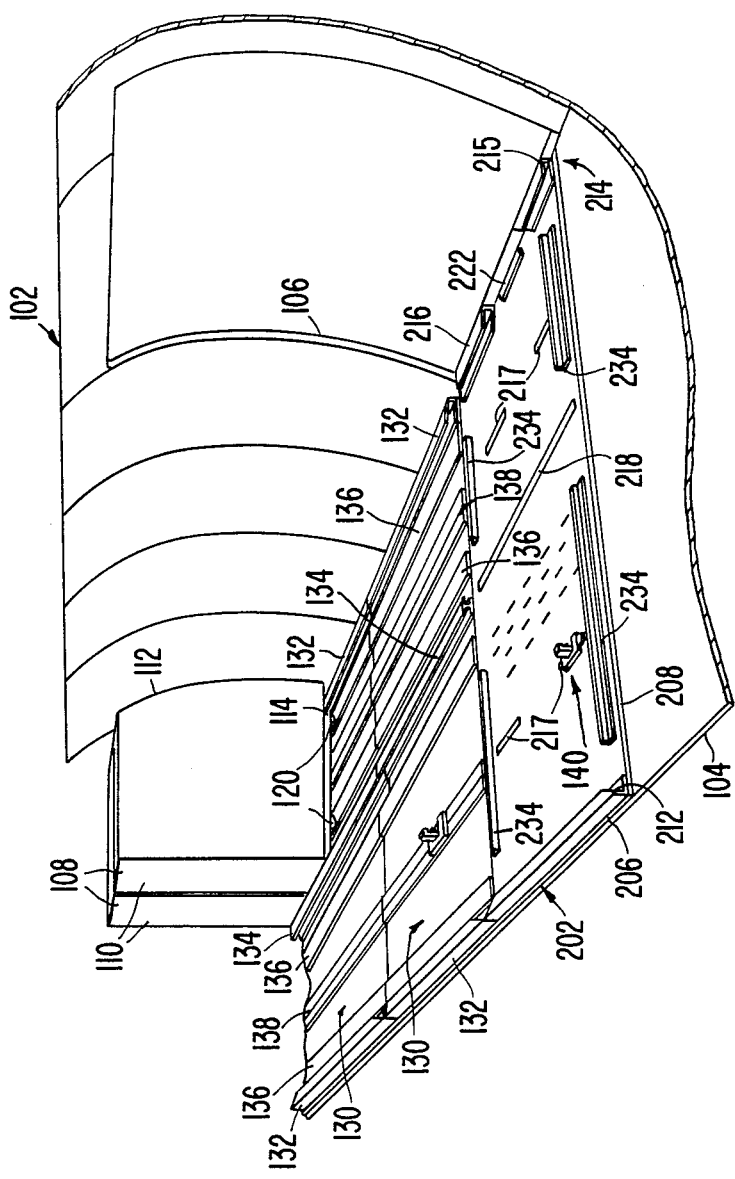
FIG. 1 shows a perspective view of the pallet of the invention in position within the fuselage of a cargo aircraft adjacent to the main cargo door.

The cargo pallet of the invention is designed to facilitate the loading of cargo aircraft with relatively small wheeled containers, of the type described in U.S. Pat. No. 4,747,504. The general manner in which the containers are stowed in the aircraft may be seen by reference to FIG. 1, which shows the interior of a portion of the cargo bay of a cargo-carrying aircraft. FIG. 1 shows a cutaway perspective view of the interior of a cargo aircraft fitted with the cargo container stowage equipment with which the cargo pallet of this invention is designed to be used. A cargo aircraft fuselage 102 having a floor 104 and a door 106 in the side of the fuselage is fitted with lateral guide rails 132 running down each side of the cargo bay and a center guide rail 134 running down the center of the cargo bay. While the rails can be fixed to the floor of the aircraft, a more versatile arrangement involves the use of cargo pallets 130, as shown in the drawing, which are equipped with side rails 132 and center rails 134 and means for linking the pallets together to form a continuous cargo-supporting deck, with the rails being essentially continuous, except for small gaps, along the sides and down the center of the cargo bay.

The cargo containers 108, two of which are shown in stowed position, have lateral and vertical dimensions so that each container fills approximately half of the cross section of the cargo bay and a longitudinal dimension which will permit the containers to be loaded through the relatively small door of a passenger aircraft which has been converted to cargo service. Each container has an inboard end 110 which is a generally vertical wall, and an outboard end 112 which is shaped to conform generally to the curvature of the fuselage wall 102. Accordingly, when the containers are stowed in pairs, each pair of containers completely fills the cross-section of the cargo bay. Each container 108 has a bottom frame 114 which supports the container and is provided with caster wheels 120 and flanges 122 which engage the guide rails to provide lateral and vertical restraint. As shown in FIG. 8, which shows the lateral guide rail, the flanges 122 cooperate with the longitudinally oriented guide rails 132, 134 to keep the containers from shifting sideways or vertically within the body of the aircraft.

The aircraft may provided with cargo restraining stops, not shown, in the cargo bay floor which restrain the pallets in position and may extend upward between the pallets to restrain the cargo. Preferably containers are of such dimensions that three of the containers span the fore-and-aft dimension of the cargo pallet. Under these circumstances the restraints built into the aircraft will engage and restrain every third container, which is sufficient for safe stowage. In order to provide for stowage of containers when less than a full load is carried, the rail-carrying pallets are also provided with stop mounting tracks 138 upon which retracting cargo stops 140 can be mounted. These cargo stops, described more fully below, can be retracted to permit loading of the containers and then extended to restrain the containers in stowed position.

Containers of the type disclosed in U.S. Pat. No. 4,747,504 are usually rolled through the aircraft passenger door on their own wheels. The containers are then rotated if necessary so that their retaining flanges are laterally oriented to cooperate with the guide rails of the aircraft, and pushed to the left side or right side of the cargo bay according to the loading plan. Each container 108 is then pushed into the cargo bay, the wheels rolling on caster planks 136 mounted on the cargo pallets 130, until it abuts the previously loaded container. Retractable or foldable stops located either in the floor of the aircraft or on the cargo pallets are raised into the restraining position after each container or after each group of containers to prevent the load from shifting longitudinally. The cargo stops provide fore-and-aft restraint of the containers; the vertical and lateral restraint is provided by the side and center rails.

The pallet of this invention is designed to increase the utility of the container-retaining rail cargo stowage system by providing a clear working area within the aircraft cargo bay during loading of the containers, while being capable of conversion to a cargo-restraining pallet analogous to the rest of the cargo pallets in order to secure the last few containers loaded and thereby utilize fully the space near the door of the aircraft. To this end the pallet of this invention is provided with a removable center rail, a side rail which has a gap to permit containers to be loaded by rolling them through the door, and removable and retractable cargo stops to secure the last-loaded containers. In the early stages of loading the center rail and any cargo stops which might interfere with easy maneuvering of the containers during loading are removed. This is the configuration shown in FIG. 1. When the cargo bay has been filled except for the area near the door, the center rails are attached and the retractable stops positioned to restrain the last few containers loaded and thus make use of the entire cargo bay of the aircraft.

Figure 2:
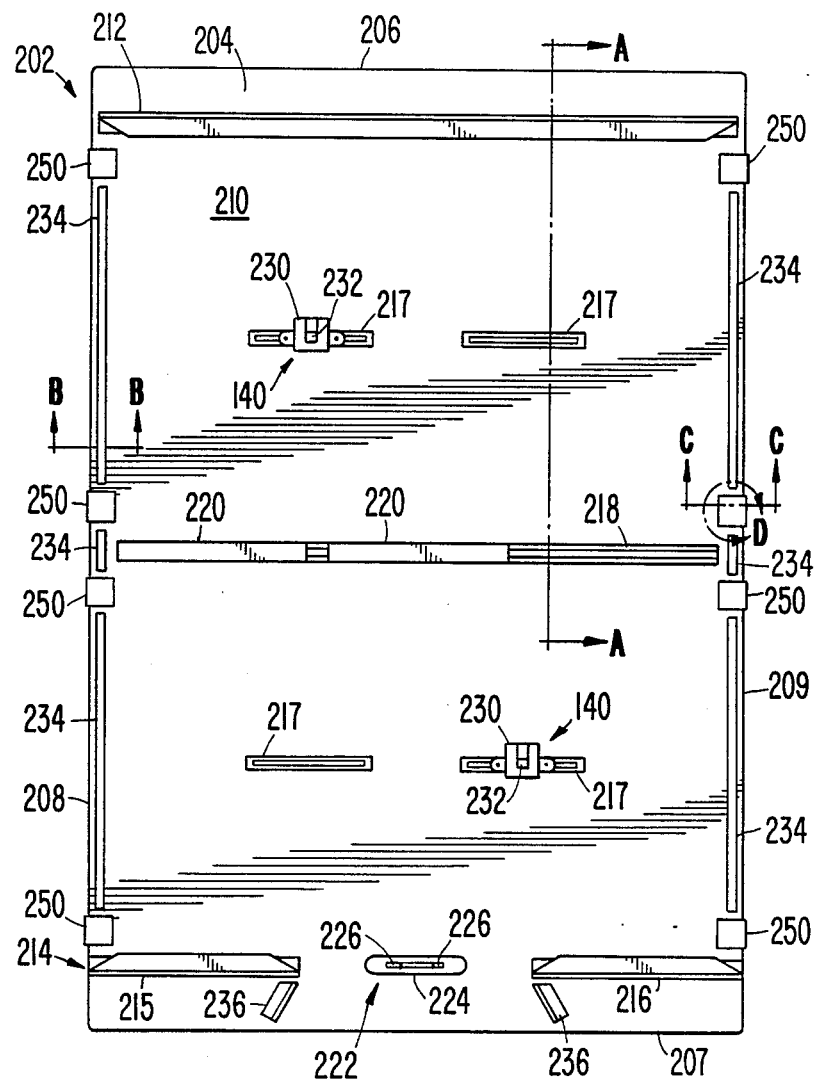
FIG. 2 shows a plan view of the main cargo door pallet of this invention.

FIG. 2 shows a plan view of one embodiment of the cargo loading pallet of the invention, indicated generally by reference numeral 202, while FIG. 3 shows a front elevation view and FIG. 4 shows an elevation view from the left side. The pallet 202 comprises a generally rectangular base 204 is designed to be located within the fuselage of a cargo aircraft adjacent to the main cargo door door and oriented so that the short dimension of the rectangle is generally parallel to the longitudinal axis of the fuselage and the longer dimension of the rectangle is oriented generally transverse to the longitudinal axis of the fuselage. Accordingly, the base has two lateral edges, edge 206 opposite the aircraft main cargo door and edge 207 adjacent to the aircraft main cargo door, and two transverse edges, a forward transverse edge 208 and a rear transverse edge 209. On the upper surface 210 of the base 202 are located several fixtures arranged for the convenient loading and stowing of cargo containers. The embodiment shown is designed for use with an aircraft having a main cargo access door on the left side of the fuselage. Accordingly, the side opposite the main cargo door is the right side of the pallet and the side adjacent the door is the left side.

Along the lateral edge 206 opposite the door 106 of the aircraft is a guide rail which cooperates with flanges on the cargo containers !08 to restrain the containers in horizontal and vertical directions. The guide rail has the same general cross section as the guide rails 110 on the cargo pallets and performs the same function. Along the lateral edge 207 of the base 202 adjacent the aircraft door is a two-part guide rail 214. The rail has a forward portion 215 and a rear portion 216, and cooperates with the flanged containers 108 in the same way as the other guide rails. Generally centered along the lateral edge 207 of the base 202 is a retractable side lock 222, best seen in FIG. 5. The side lock is of conventional design and is provided with pivoted latches which can be folded flat to permit the containers to pass over the base of the side lock as they are loaded. When the containers have been loaded the folding latches of the side lock are raised to complete the restraint of the last-loaded containers.

The gap in the lateral guide rail adjacent the door need not be located in the middle of the rail. One or more such spaces may be located at the end or in the middle of either lateral guide rail to accommodate a particular aircraft configuration or to permit the pallet to be used in more than one model of aircraft. It is preferred that each such space be provided with side lock means to restrain containers. However, in particular instances the side lock may be omitted if a container is not stowed at that position or is restrained by other means.

Recessed into the top surface 210 of the base 203 along the longitudinal center line of the base 204 is a standard heavy-duty aircraft seat-mounting track, to which the center rail 220 of the pallet is secured by conventional fastening devices. The center rail 220 itself is preferably made in two or more sections for convenient installation and to permit the easy loading of the final containers. In FIG. 2 the center rail 220 is made in three section, two of which are shown installed. The base 204 of the pallet also includes anchor means 216 for mounting removable cargo stops 140. The anchor means 217 for each stop 140 is conveniently made from conventional seat mounting track recessed into the top plate 260 of the base 204.

FIG. 2 also shows optional cargo guides 236 located adjacent the gap in the lateral guide rail 214 to assist in directing the wheeled containers 108 through the gap.

Figure 7:
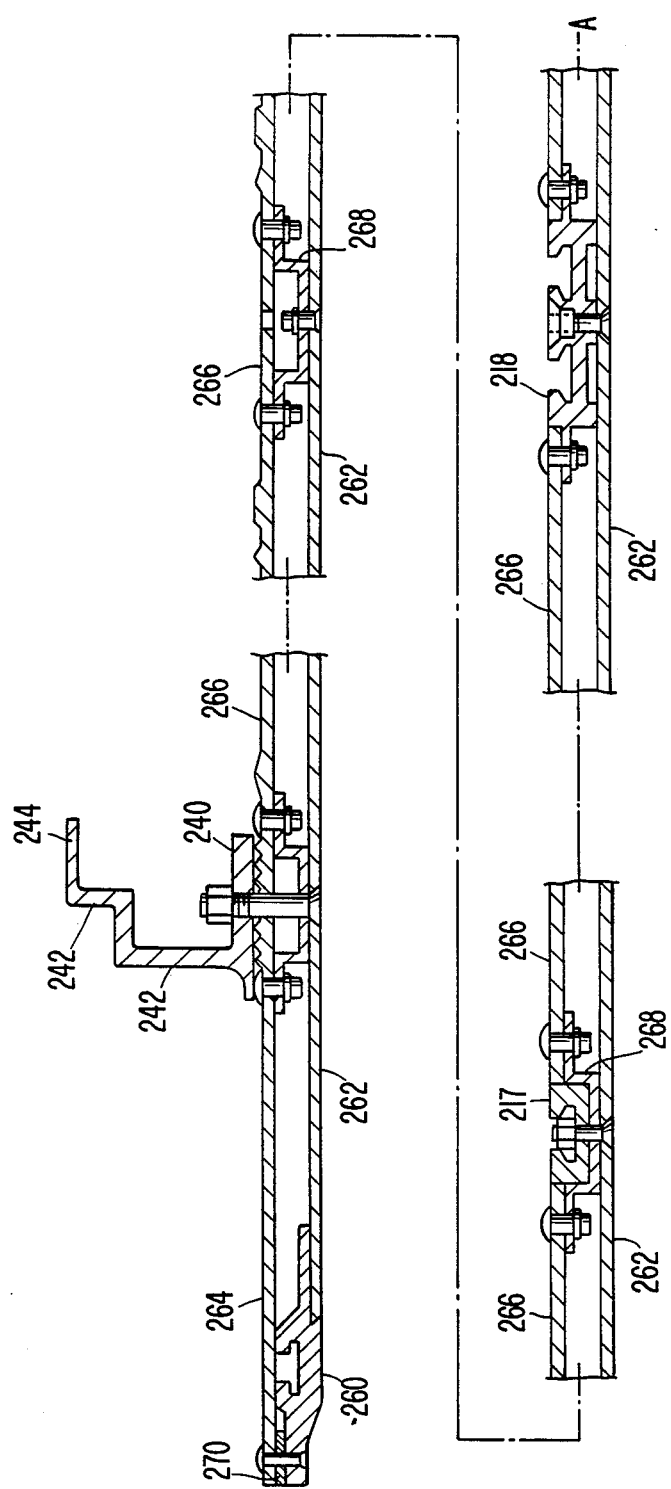
FIG. 7 shows a cross section of a portion of the pallet at A—A in FIG. 2, showing the construction of the pallet with the lateral guide rail and the seat track anchor means for the cargo stops and center guide rail.

FIG. 7 shows a cross-section of the pallet of this invention taken along the line A—A in FIG. 2. The base 204 of the pallet is comprised of frame members 260 making up each edge of the pallet base 204, a bottom plate 262, top edge plates 264 along each lateral edge of the pallet, and one or more top center plates 266. Spacers 268 extend longitudinally at intervals to connect and space the top center plate 266 and bottom plate 262, and edge spacers 270 space the top edge plate 264 and the frame member at the edge of the pallet base 204. The seat track 217 which comprises the mounting means for the cargo stops 140 is recessed into the top of the pallet just under the top center plate 266. Similarly, the double seat track 218 which provides the mounting means for the center guide rail 220 is also recessed under the to center plate 266 along the center line of the pallet.

The cooperation between the restraining rails and the containers having flanged bases is illustrated in FIG. 8. The cargo container 108, only the relevant portion of which is shown, with its outboard wall 112 has a bottom frame 114 which contains a housing 116 for caster 122 with its wheel 120 which is fastened to the frame 114 via the caster swivel 118. The frame 114 of the container 108 has a laterally extending flange 124. The guide rail 212 has a vertically extending web 240 and a laterally extending horizontal flange 242. The vertically extending web 240 may be a single vertical structure or may be bent as shown in FIG. 7. In any case, the uppermost portion of the web 240 extends in a generally vertical direction and provides a surface against which the laterally extending flange 124 of the cargo container 108 may bear to restrain the container in a direction transverse to the longitudinal axis of the cargo bay. The cargo container flange 124 extends under the horizontal flange 242 of the restraining rail 212 to restrain possible vertical movement of the cargo container.

Figure 5:
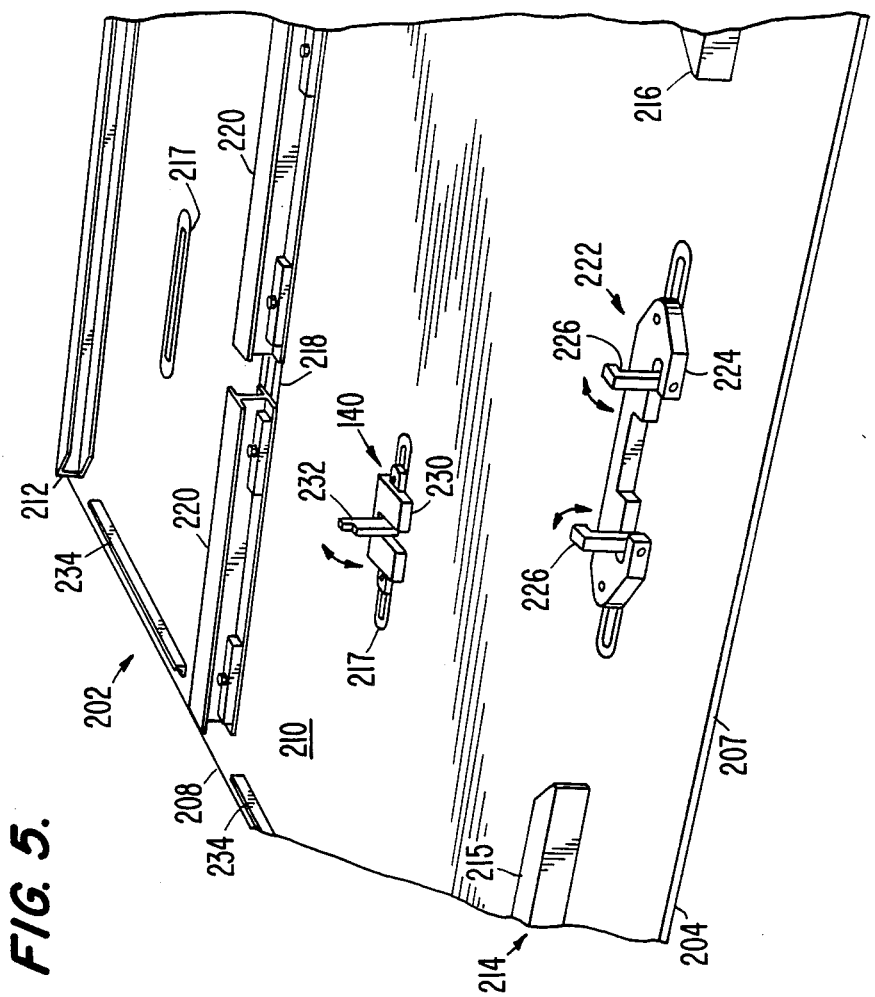
FIG. 5 shows a perspective view of the significant features of the cargo pallet from the left side.

The retractable side lock means 222 is best seen in FIG. 5. The side lock means 222 comprises a base 224 and one or more latches 226 which fold to a retracted position parallel to the surface of the pallet and extend vertically, as shown, to restrain the lateral movement of the adjacent cargo container.

The retractable and removable cargo stops 140, as shown in FIG. 5, comprise a base 230 and a folding cargo stop latch 232 which folds to a retracted position parallel to the surface of the pallet and is pivoted into its vertically extending position to provide a restraint for the cargo container. The removable cargo stops 140 are attached to recessed strips of standard seat track 217.

The removable center rail 220, which is preferably made in sections, as shown in FIG. 5, wherein the removable center rail has three sections, is fastened to recessed strips of standard double seat mounting track 218 by conventional fasteners.

Figure 6:
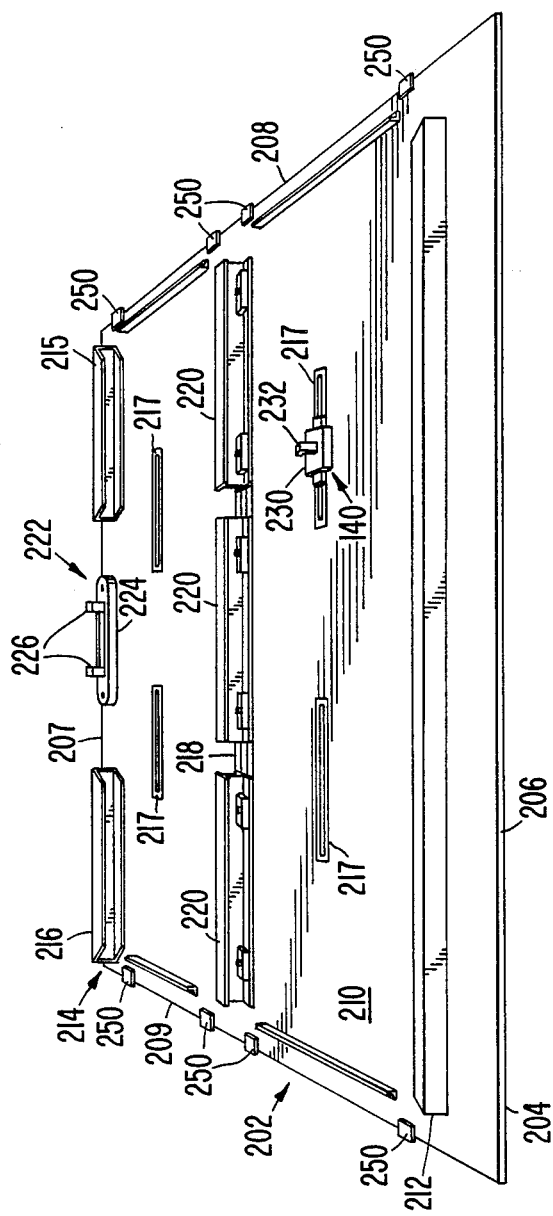
FIG. 6 shows a perspective view of the cargo pallet from the right side.

FIG. 6 is a perspective view of the pallet of the invention from the right side. FIGS. 5 and 6 show all three sections of the center guide rail installed, while FIG. 2 shows two of the three sections installed.

In order to prevent the wheeled containers 108 from rolling off the edge of the pallet at points other than intended, the pallet of the invention is provided with wheel stops 234 located generally along the forward and rear transverse edges. The mounting of the wheel stops is shown in FIG. 9 which has a cross section taken along line B—B in FIG. 2. The wheel stop 234 is fastened to the frame member 260 with conventional fasteners. The edge spacer 270 supports the edge of the top plate 266.

In order to bridge the gap between adjacent pallets to provide for smooth rolling of containers from one pallet to the next, cover plates 250 are provided. The cover plates shown in the illustrated embodiment of the pallet are plain, and are shown in cross section in FIG. 10 taken along line C—C in FIG. 2. The cover plates are typically fastened to the pallet frame member 260 with conventional bolts and flush nuts 258, passing through a reinforcing block 259. Alternatively, the cover plates may be hinged as shown in plan view in FIG. 12 of the area indicated as D in FIG. 2, and cross-section in FIG. 11. The hinged cover plates incorporate a hinge mounting plate 256, fastened to the frame member 260 with bolts and flush nuts 258 and reinforcing block 259, as for the plain cover plates. The hinge mounting block supports the hinged cover plate 252 via hinge 254.

Figure 13:
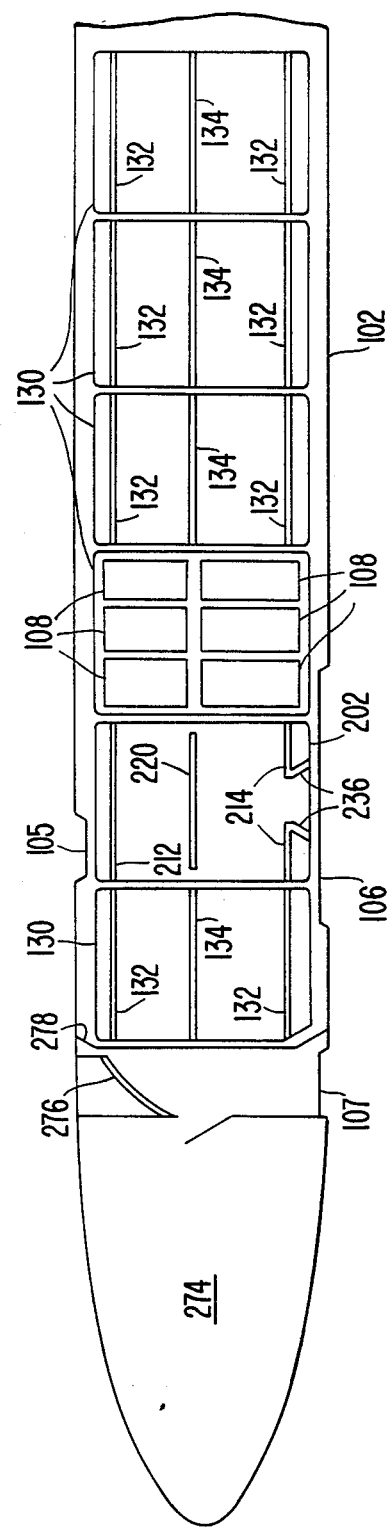
FIG. 13 is a schematic cut away plan view of an aircraft fuselage showing the location of a pallet of this invention with respect to the main cargo door and other cargo pallets equipped with guide rails.

FIG. 13 is a schematic cut away plan view of the forward part of the fuselage 102 of a typical cargo-passenger aircraft, showing the cargo pallet of this invention in use together with other cargo pallets to provide for easy loading and stowage of cargo containers. The fuselage 102 has a cockpit area 274 at the nose and is equipped with both a passenger door 107 and a main cargo door 106, as well as a service door 105. The interior of the fuselage may be equipped with a container guide rail 276 for use when containers are to be loaded through the passenger door 107. A 9-g cargo net 278 is provided to restrain the cargo from shifting forward. The cargo bay of the fuselage contains a series of cargo container pallets 130 provided with guide rails as described above. The cargo container loading pallet 202 of this invention is positioned within the fuselage 102 at the main cargo door 106. The container loading pallet 202 is shown with the center retaining rail 220 removed as when the containers are being loaded into the cargo bay. The recessed seat track 218 on which the center retaining rail 220 is mounted is substantially flush with the upper surface of the cargo loading pallet 220 and does not interfere with maneuvering the containers into position to be pushed onto the cargo container pallets 130. One of the cargo container pallets 130 is shown loaded with six cargo containers 108.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A pallet for loading cargo containers into a fuselage of an aircraft comprising a generally planar rectangular base dimensioned to fit within the fuselage of an aircraft, said fuselage having a longitudinal axis and sidewalls, and said base having a pair of lateral edges positioned adjacent to said sidewalls and oriented generally parallel to said longitudinal axis and a pair of transverse edges oriented generally at right angles to said longitudinal axis and a centerline located substantially midway between said lateral edges and oriented generally parallel to said longitudinal axis;

a lateral guide rail mounted on said base adjacent to each of said lateral edges and extending generally parallel to said lateral edges;

each of said lateral guide rails comprising a lateral rail base for supporting said lateral rail on said pallet base, a generally vertical web, supported on said lateral rail base, extending generally upward and terminating in an upper extremity, and a generally horizontal flange projecting from said upper extremity of said vertical web toward said centerline;

at least one of said lateral rails extending along less than the full extent of said lateral edge whereby a transfer space is left unobstructed by said lateral rails along said lateral edge through which a cargo container may be moved across the edge of said pallet and onto said pallet;

central anchor means located on said centerline for removably attaching to said pallet base a central guide rail; and retractable side lock means located generally within said transfer space.

2. The pallet of claim 1 wherein said side lock means comprises a side lock base mounted on said pallet base, and at least one elongated latch pivotably attached to said side lock base whereby said latch is movable between a first retracted position wherein it does not engage cargo containers and an extended position generally perpendicular to said base wherein it engages cargo containers and restrains their movement in at least one direction.

3. The pallet of claim 1 additionally comprising wheel stops extending along at least one of said transverse edges.

4. The pallet of claim 1 additionally comprising at least one cover plate extending from at least one of said transverse edges.

5. The pallet of claim 4 wherein said cover plate is a plain cover plate.

6. The pallet of claim 4 wherein said cover plate is a hinged cover plate.

7. The pallet of claim 1 additionally comprising a center guide rail fastened to said central anchor means, said center guide rail comprising a center rail base for supporting said center guide rail on said pallet base, a generally vertical web extending upward from said center rail base and terminating in an upper extremity and a generally horizontal flange projecting from said upper extremity of said vertical web toward at least one of said lateral edges.

8. The pallet of claim 1 additionally comprising cargo stop anchor means on said pallet base for anchoring thereto cargo stops.

9. The pallet of claim 1 additionally comprising at least one cargo stop fastened to said cargo stop anchor means.

10. The pallet of claim 9 wherein said cargo stop comprises a base and an elongated latch pivotably attached to said base, whereby said latch is movable between a first retracted position wherein it does not engage cargo containers and an extended position generally perpendicular to said base wherein it engages cargo containers and restrains their movement in at least one direction.

11. A pallet for loading cargo containers into a fuselage of an aircraft comprising a generally planar rectangular base dimensioned to fit within the fuselage of an aircraft, said fuselage having a longitudinal axis and sidewalls, and said base having a pair of lateral edges positioned adjacent to said sidewalls and oriented generally parallel to said longitudinal axis and a pair of transverse edges oriented generally at right angles to said longitudinal axis and a centerline located substantially midway between said lateral edges and oriented generally parallel to said longitudinal axis;

a first lateral guide rail mounted on said pallet base adjacent to a first lateral edge of said pallet base and extending along substantially the entire extent of said first lateral edge;

a second lateral guide rail mounted on said pallet base at the second of said lateral edges and extending parallel to said lateral edge, said second lateral guide rail comprising two collinear rails having their adjacent ends spaced apart, said adjacent ends thereby defining an transfer space wide enough to permit the passage therethrough of a cargo container;

each of said guide rails comprising a lateral rail base for supporting said rail on said pallet base, a generally vertical lateral rail web, supported on said lateral rail base, extending upward from said lateral rail base and terminating in an upper extremity, and a generally horizontal flange projecting from said upper extremity of said vertical lateral rail web toward said centerline;

central anchor means located on said centerline for removably attaching to said pallet base a central guide rail, said central guide rail extending generally along said centerline; and retractable side lock means located generally within said transfer space.

12. The pallet of claim 11 wherein said side lock means comprises a side lock base mounted on said pallet base, and at least one elongated latch pivotably attached to said side lock base whereby said latch is movable between a first retracted position wherein it does not engage cargo containers and an extended position generally perpendicular to said base wherein it engages cargo containers and restrains their movement in at least one direction.

13. The pallet of claim 11 additionally comprising wheel stops extending along at least one of said transverse edges.

14. The pallet of claim 11 additionally comprising at least one cover plate extending from at least one of said transverse edges.

15. The pallet of claim 14 wherein said cover plate is a plain cover plate.

16. The pallet of claim 14 wherein said cover plate is a hinged cover plate.

17. The pallet of claim 11 additionally comprising a center guide rail fastened to said central anchor means, said center guide rail comprising a center rail base for supporting said center guide rail on said pallet base, a generally vertical center rail web extending upward from said center rail base and terminating in an upper extremity, and a generally horizontal flange projecting from said upper extremity of said vertical center rail web away from said centerline.

18. The pallet of claim 11 additionally comprising cargo stop anchor means on said pallet base for anchoring thereto cargo stops.

19. The pallet of claim 11 additionally comprising at least one cargo stop fastened to said anchor means.

20. The pallet of claim 19 wherein said cargo stop comprises a base and an elongated latch pivotably attached to said base, whereby said latch is movable between a first retracted position wherein it does not engage cargo containers and an extended position generally perpendicular to said base wherein it engages cargo containers and restrains their movement in at least one direction.

21. The pallet of claim 11 additionally comprising cargo guides disposed at said second lateral edge of said pallet base on either side of said transfer space.

* * * * *